(12) United States Patent
Carlson

(10) Patent No.: US 7,729,506 B2
(45) Date of Patent: Jun. 1, 2010

(54) APPARATUS AND METHOD FOR CREATING THREE DIMENSIONAL RELIEF TILES

(75) Inventor: Keith R. Carlson, Scottsdale, AZ (US)

(73) Assignee: Keith Carlson, Laguna Beach, CA (US)

( * ) Notice: Subject to any disclaimer, the term of this patent is extended or adjusted under 35 U.S.C. 154(b) by 381 days.

(21) Appl. No.: 10/956,663

(22) Filed: Oct. 1, 2004

(65) Prior Publication Data

US 2005/0251275 A1 Nov. 10, 2005

Related U.S. Application Data

(60) Provisional application No. 60/568,806, filed on May 6, 2004.

(51) Int. Cl.
*G06F 19/00* (2006.01)
(52) U.S. Cl. ............... 382/100; 700/98; 700/197
(58) Field of Classification Search ............ 382/154, 382/100; 700/98, 197
See application file for complete search history.

(56) References Cited

U.S. PATENT DOCUMENTS

| | | | | |
|---|---|---|---|---|
| 4,158,533 A | * | 6/1979 | Longinotti | 425/139 |
| 4,188,943 A | * | 2/1980 | Sjostrand | 602/9 |
| 4,574,536 A | * | 3/1986 | Bamber et al. | 52/125.3 |
| 4,746,365 A | * | 5/1988 | Babcock et al. | 524/4 |
| 5,040,005 A | * | 8/1991 | Davidson et al. | 396/429 |
| 5,515,903 A | * | 5/1996 | Hronas et al. | 164/45 |
| 5,762,125 A | * | 6/1998 | Mastrorio | 164/4.1 |
| 5,762,967 A | * | 6/1998 | Sagawa et al. | 425/3 |
| 5,878,218 A | * | 3/1999 | Maddalozzo et al. | 709/213 |
| 5,982,378 A | * | 11/1999 | Kato | 345/582 |
| 6,052,692 A | * | 4/2000 | Anderson et al. | 707/102 |
| 6,723,434 B2 | * | 4/2004 | Setten et al. | 428/426 |
| 2001/0055407 A1 | * | 12/2001 | Rhoads | 382/100 |
| 2002/0064759 A1 | * | 5/2002 | Durbin et al. | 433/213 |
| 2003/0034970 A1 | * | 2/2003 | Hubeli et al. | 345/420 |
| 2004/0051921 A1 | * | 3/2004 | Kremen | 359/28 |
| 2004/0183796 A1 | * | 9/2004 | Velde et al. | 345/419 |
| 2004/0189641 A1 | * | 9/2004 | Stephenson et al. | 345/443 |
| 2004/0218209 A1 | * | 11/2004 | Hamaguchi et al. | 358/1.15 |

OTHER PUBLICATIONS

Adobe Systems Inc., Adobe Photoshop User Guide-version 2.5 for Macintosh, 1993, Adobe Systems Inc., pp. 98-99.*
Giordan et al., "Using Adobe Photoshop 5," Jul. 1998, Que, pp. 41-42, 44, 52, 70, 83-87, 560-564, and 647.*
ZPrinter™ 310 System, Z Corporation, 2003.*
ZCast™ powder, Z Corporation, 2003.*
Gardener, "About Heightfields," May 20 2003, Daylon Graphics, pp. 1-6.*

* cited by examiner

*Primary Examiner*—Samir A Ahmed
*Assistant Examiner*—John W Lee

(57) ABSTRACT

An electronic file containing height field mapping data is output to a specialized printer and used to create one or more three dimensional molds. The molds, in turn, may be used to fabricate bas-relief tiles and similar three-dimensional objects from various materials. The process allows for rapid deployment of customized design elements in many construction applications and environments.

8 Claims, 2 Drawing Sheets

APPARATUS AND METHOD FOR CREATING THREE DIMENSIONAL RELIEF TILES

CROSS REFERENCE TO RELATED APPLICATION

This application claims the benefit of the filing date for U.S. Provisional Patent Application No. 60/568,806, filed on May 6, 2004, which application is incorporated herein by reference.

BACKGROUND OF THE INVENTION

1. Technical Field

The present invention relates generally to manufacturing and more particularly to a process for the creation of certain three-dimensional building materials.

2. Background Art

The construction industry is a constantly evolving and rapidly growing industry, particularly with respect to the development of new and useful processes and materials to be used in the construction of new buildings. The creation and adoption of new processes and materials fuels the growth of the industry by allowing architects to exercise additional freedom in designing new structures that benefit from the inclusion of additional options based on the new processes and materials.

One popular option in many construction projects is the use of various three-dimensional tiles to create a "bas-relief" look and feel. In most cases where these three-dimensional tiles are manufactured by automated processes, the resulting three-dimensional tiles tend to be fairly pedestrian in nature, acknowledging the practical reality of appealing to a mass-market consumer base. Alternatively, where these three-dimensional tiles are laboriously manufactured by hand to create a more desirable custom look, the cost of the resultant three-dimensional tiles can be prohibitive for many applications. Accordingly, while the inclusion of custom three-dimensional tiles may be desirable in certain buildings, the cost may dictate the use of other, less desirable alternatives.

Another significant addition to the design repertoire of many architects is the constantly expanding palette of materials that may be used in various construction applications. For example, new types of glass, plastics and various polymers are being used in new and creative ways for creating bold and exciting design elements that can be incorporated into new buildings and structures.

Finally, new design and construction methodologies have also been enhanced by the development and deployment of certain computer-based technologies that can be used in the overall design and construction process. New software applications allow architects and builders to create sophisticated computer models of new buildings before a single construction worker lifts a hammer to pound a nail. Additionally, architects and designers can now use computers to experiment with materials, colors, and textures for new construction projects before committing to a final design. Finally, the continually accelerating growth and deployment of computer technology has provided significant advantages in the construction industry, even in mundane areas such as estimating, project management, etc.

While all of these various methods, materials and technologies have successfully added value to the construction industry, additional progress can be achieved. Specifically, many of the emerging technologies have yet to find their way to the ultimate destination where the greatest advantage may be realized. Disparate computer technologies and nascent understanding of the application for new materials have combined to slow the rapid adoption and deployment of these items in certain areas of the construction industry. Additionally, some new materials and technologies are still very expensive and difficult to deploy, making it difficult to integrate them into more traditional application environments.

Accordingly, without improved integration and deployment of the various methods, materials and technologies now emerging in the construction industry, the overall design and construction process will continue to be sub-optimal in at least some respects.

BRIEF SUMMARY OF THE INVENTION

As disclosed herein, an electronic file containing height field mapping data is output to a specialized printer and used to create one or more three dimensional molds. The molds, in turn, may be used to fabricate bas-relief tiles and similar three-dimensional objects from various materials. The process allows for rapid deployment of customized design elements in many construction applications and environments. In the most preferred embodiments of the present invention, loading a digital image file into a computer memory, a three-dimensional (3D) model is created based on a digital image file and a 3D printer is used to create an object from the 3D model. Then, a mold is created from the object. Then, a bas-relief tile or other object can be created from the mold.

BRIEF DESCRIPTION OF DRAWINGS

The preferred embodiments of the present invention will hereinafter be described in conjunction with the appended drawings, wherein like designations denote like elements, and.

DETAILED DESCRIPTION

Figure 1:
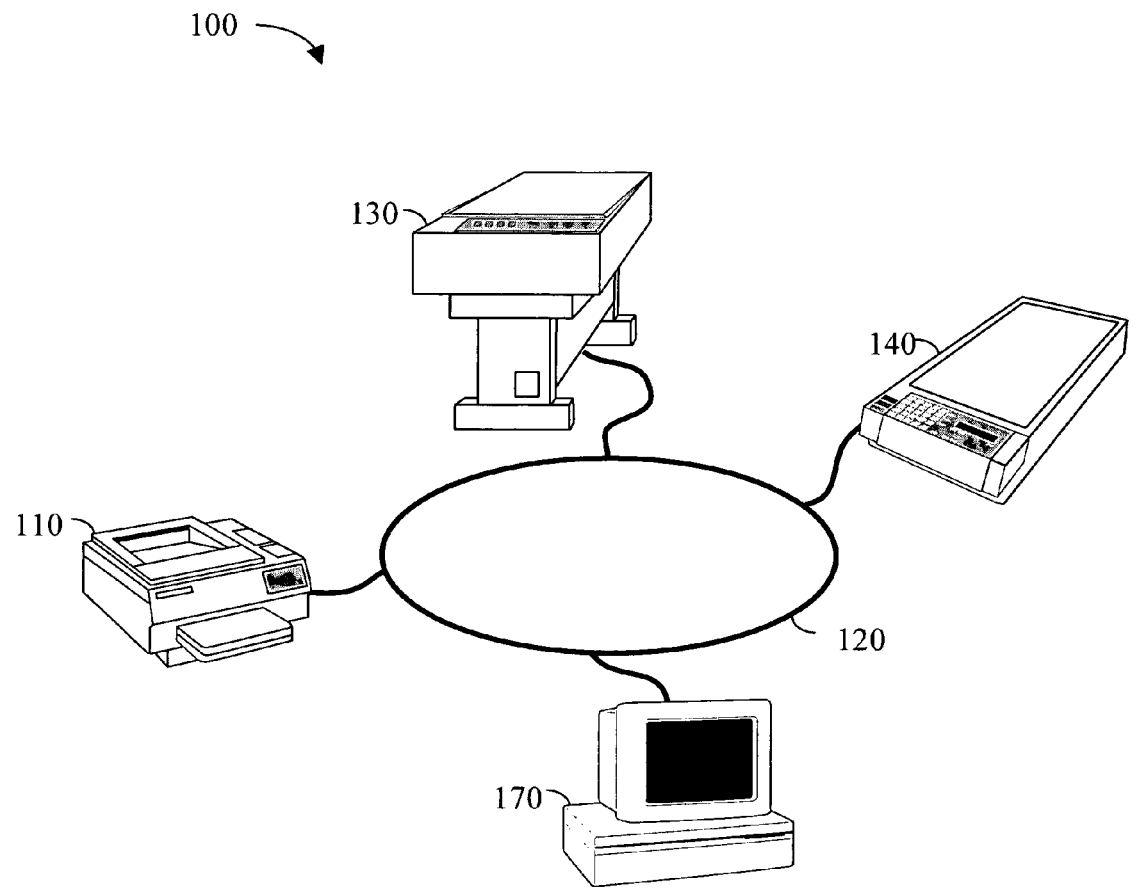
FIG. 1 is a computer-based system for creating three-dimensional objects in accordance with a preferred embodiment of the present invention.

Referring now to FIG. 1, a system 100 for creating three-dimensional tiles in accordance with a preferred embodiment of the present invention comprises: a computer 170 a printer 110; a three-dimensional (3D) printer 130; and a scanner 140, all connected via a network 120.

Computer 170 may be any type of computer system known to those skilled in the art that is capable of being configured for use with system 100 as described herein. This includes laptop computers, desktop computers, tablet computers, pen-based computers and the like. Additionally, handheld and palmtop devices are also specifically included within the description of devices that may be deployed as computer 170. Computer 170 comprises one or more processing units and various types of memory for processing and manipulating data. Additionally, computer 170 comprises a video screen for outputting results to the user of computer 170 and a keyboard and/or mouse for inputting information into computer 170.

It should be noted that no specific operating system or hardware platform is excluded, and it is anticipated that many different hardware and software platforms may be configured to create computer 170. Additionally, various hardware components and software components (not shown in FIG. 1) known to those skilled in the art may be used in conjunction with computer 170. In the most preferred embodiments of the present invention, computer 170 is a standard desktop personal computer configured with an appropriate operating system (i.e., UNIX, MS Windows, Mac OSX, etc.) and other related software applications for implementing the preferred embodiments of the present invention as described herein.

Network 120 is any suitable computer communication link or communication mechanism, including a hardwired connection, an internal or external bus, a connection for telephone access via a modem or high-speed T1 line, infrared or other wireless communications, private or proprietary local area networks (LANs) and wide area networks (WANs), as well as standard computer network communications over the Internet or an internal network (e.g. "intranet") via a wired or wireless connection, or any other suitable connection between computers and computer components known to those skilled in the art, whether currently known or developed in the future. It should be noted that portions of network 120 may suitably include a dial-up phone connection, broadcast cable transmission line, Digital Subscriber Line (DSL), ISDN line, or similar public utility-like access link.

In the most preferred embodiments of the present invention, at least a portion of network 120 may also represent and comprise a standard Internet connection between the various components of system 100. Network 120 provides for communication between the various components of system 100 and allows for relevant information to be transmitted from device to device. In this fashion, a user can quickly and easily gain access to the relevant data and information utilized to create the three-dimensional objects as described in conjunction with the preferred embodiments of the present invention. Regardless of physical nature and topology, network 120 serves to logically link the physical components of system 100 together, regardless of their physical proximity. This is especially important because in many preferred embodiments of the present invention, computer 170 and one or more of the other components of system 100 may be geographically remote and separated from each other.

3D printer 130 is most preferably an output device that is capable of building physical models directly from processed electronic data files. In the most preferred embodiments of the present invention, 3D printer 130 receives electronic data via network 120 and fabricates one or more three-dimensional models by moving an ink jet print head over the appropriate locations and depositing a binder solution through the ink jet print head onto layers of a plaster-based powder. By repeatedly depositing powder in specified locations, the printer creates a buildup of powder in the desired locations. By layering the powder and appropriate resins and/or binders, stable three-dimensional objects can be created from electronic data files. These finished three-dimensional objects will be real world versions of the object or objects depicted in the electronic data files. Suitable 3D printers are manufactured by Z Corporation, 20 North Avenue Burlington, Mass. 01803.

Optional printer 110 and an optional flatbed scanner 140 are standard peripheral devices that may be used for inputting and/or outputting various transactions, reports, etc. in conjunction with the creation of three-dimensional objects by system 100. Optional printer 110 and optional flatbed scanner 140 may be directly connected to network 120 or indirectly connected via computer 170. Finally, it should be noted that optional printer 110 and optional flatbed scanner 140 are merely representative of the many types of computer peripherals that may be utilized in conjunction with system 100. It is anticipated that other similar peripheral devices will be deployed in the various preferred embodiments the present invention and no such device is excluded by its omission in FIG. 1.

Figure 2:
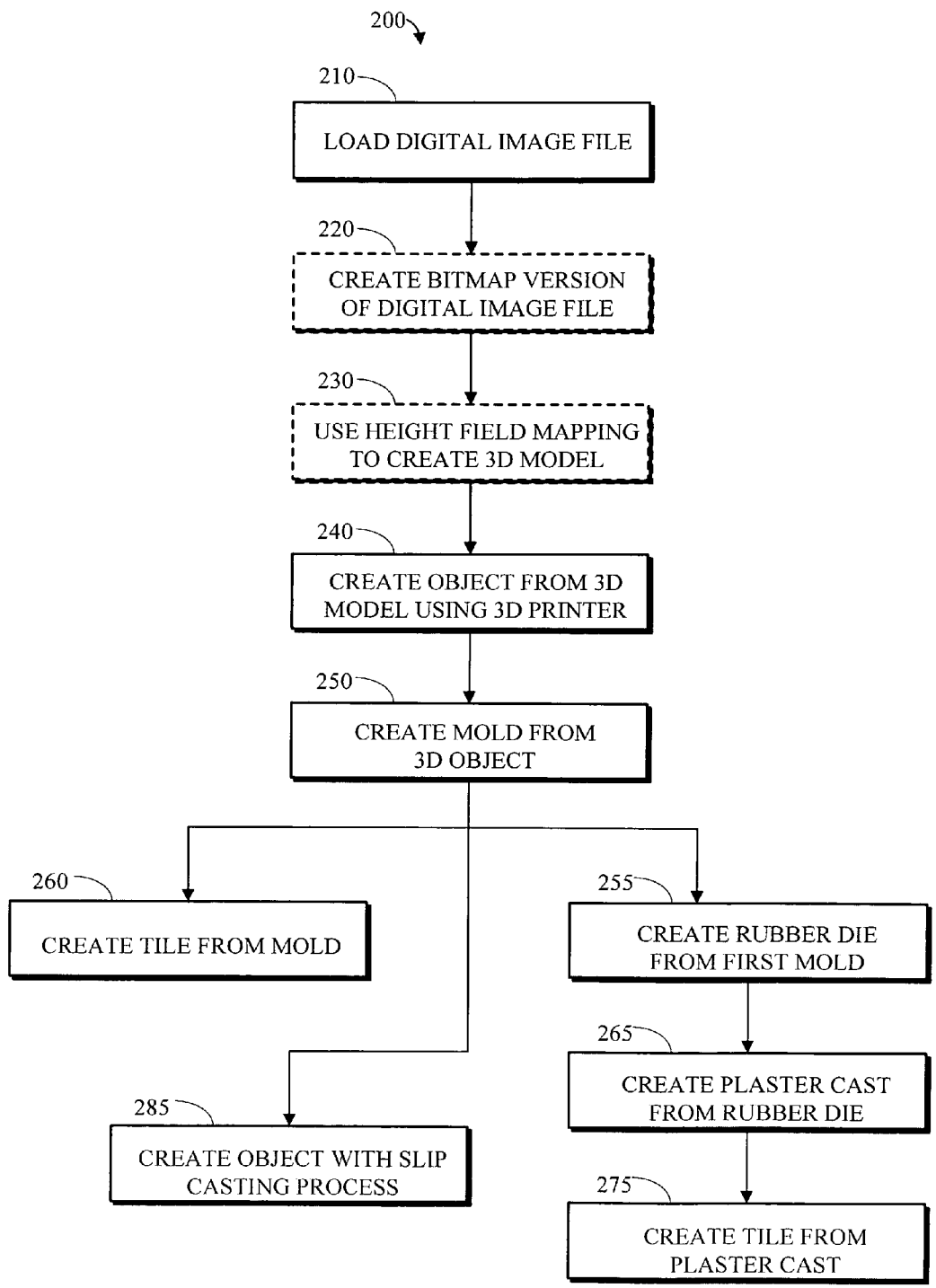
FIG. 2 is a flowchart for a method of creating three-dimensional objects in accordance with a preferred embodiment of the present invention.

Referring now to FIG. 1 and FIG. 2, a method 200 for creating three-dimensional tiles using system 100 of FIG. 1 in accordance with a preferred embodiment of the present invention is depicted. As shown in FIG. 2, the first step is to "load" a digital image file into the memory of computer 170 (step 210). This step may be accomplished in many different ways, depending on the type of equipment used and the source of the digital image file. For example, flatbed scanner 140 of FIG. 1 may be used to create a digital image file from a photograph or other paper-based document. Similarly, a digital image file may be loaded into the memory of computer 170 by downloading an electronic picture file from a digital camera in the form of a JPEG (.jpg) file. Alternatively, a pre-existing digital image file transferred to computer 170 via network 120 from an unknown source may be loaded into the memory of computer 170. Suitable electronic file formats include .tif, .dxg, .psd files and the like. Those skilled in the art will appreciate that there are many different file formats and a variety of ways of obtaining digital image files for use in conjunction with the preferred embodiments of the present invention. All methods and techniques known to those skilled in the art may be suitably employed in the various preferred embodiments of the present invention.

Next, depending on the specific file format requirements associated with the hardware and software used in conjunction with method 200, it may be desirable to create a bit map file from the digital image file (step 220). In this case, standard image procession software such as Adobe Photoshop® may be employed to accomplish the desired result. Those skilled in the art will recognize that many other application programs may be used as well.

Next, a 3D model of the digital image file (bitmap or otherwise) is created by using a process known as "heightfield mapping" (step 230). Heightfield mapping is the process of creating a set of numbers arranged so that they form a two-dimensional grid with each number representing a specific ground elevation. Each heightfield map has two parts. The first part is the dimension of the object in the heightfield map, expressed in terms of the number of samples across and down. The second is the height values that are arranged in a grid according to the dimensions. Each value of the height value is referred to as a "sample." A polygon mesh is used to describe the heightfield as a set of connected triangles. The samples in the heightfield determine the vertical aspect of the triangle's vertices, while the current sample location determines the triangle's location in the other two dimensions. One software application suitable for heightfield mapping in accordance with the preferred embodiments of the present invention is known as "Daylon Leveller™" and is manufactured by Daylon Graphics. Basically, once completed, the heightfield map is a three-dimensional computer model of the image contained in the digital image file being processed by computer 170.

Once the heightfield mapping has been completed, a physical object can be created from the three-dimensional computer model of the image (step 240). As explained in conjunction with FIG. 1, in the most preferred embodiments of the present invention, 3D printer 130 will be used to accomplish this task. The computer model is used to generate a series of commands that are transmitted to 3D printer 130 via network 120. 3D printer 130 then creates the actual physical object with the bas-relief version of the digital image file. Those skilled in the art will recognize that other methods could be used to create a physical object from the heightfield including Computer Numeric Controlled (CNC) milling, stereo lithography and the like. The physical object can be considered a "positive" image or model of the object depicted in the digital image file. It should be noted that in certain preferred embodiments of the present invention the process of creating the physical object may be accomplished directly from the digital image file without the intermediate step of heightfield mapping.

With the physical object in place, a mold can be created from the physical object (step 250). In the most preferred embodiments of the present invention, the mold will be a urethane rubber mold. The mold can be considered a "negative" image of the object depicted in the digital image file. Those skilled in the art will appreciate that silicone or other similar materials could also be used in the mold-making process.

The process of making a mold for use in accordance with the preferred embodiments of the present invention can be described as follows. Using wood or acrylic, a simple mold box is constructed with appropriately sized retaining walls and backboard, with dimensions suitable to accommodate the physical object. Next, the object to be molded is secured to the backboard of the retaining walls. The backboard is most preferably approximately twice the size of the object to be molded in order to allow enough "working space." The object to be molded can be secured to the backboard by applying a bead of silicone caulk or hot melt glue around the perimeter of the reverse side of the object to be molded. The object to be molded should be pressed firmly onto the backboard to create a tight seal where the object to be molded meets the backboard in order to prevent any liquid rubber from leaking underneath the object to be molded. It is desirable to ensure that there is at least a ½ inch (1.3 cm) clearance or gap between the object to be molded and retaining wall of the mold box. This gap will be equal to the wall thickness of the cured rubber mold.

With the retaining walls fastened in place and held together with C-clamps or the like, a silicone caulk may be applied to any seams in order to prevent any leakage when the mold is poured. This may includes the seams where the retaining walls contact the backboard and also where the retaining walls contact one another.

Next, it is desirable to apply two or more coats of a smoothing compound such as SuperSeal® by the Smooth-On company of 2000 Saint John Street Easton, Pa. 18042 so as to cover the entire object to be molded and the associated mold box. In the most preferred embodiments of the present invention and in accordance with the manufacturer's directions, it may be desirable to provide drying time between coats. The smoothing compound serves to fill any small undesirable voids in the object so as to create a more aesthetically pleasing mold.

Once all applied coats of the smoothing compound have dried, an application of a mold release compound such as Universal Mold Release® manufactured by the Smooth-On company may be applied to the surface of the object to be molded in order to assist in more easily removing the mold from the mold box after the mold has cured. After the mold release compound has dried, it may also be desirable to spray a light mist of the mold release compound, thereby further coating the object to be molded and the surrounding mold box. It is also possible to brush the mold release compound over the surfaces and into any areas of detail. If desired, these steps may be followed by applying another light mist of the mold release compound, letting it all dry before applying rubber the rubber to create the mold.

Once the mold release compound has dried, the mold-making compound is poured into the mold box, over and around the object to be molded. A mold-making compound such as the Smooth-On company's Reo-Flex® product may be used. Once mixed, the mold-making compound is poured into the mold box, over and around the object to be molded. Once the mold-making material has had time to cure, the mold may be removed from the object to be molded. Those skilled in the art will appreciate that the steps described herein are merely illustrative of one mold-making process and that other alternative processes may be suitably employed in various preferred embodiments of the present invention. The mold may be created using a variety of materials such as rubber, silicone, urethane, or the like.

Once the mold has been created, there are at least two different types of tiles that can be manufactured from the mold. This includes ceramic and/or glass tiles and gypsum polymer tiles. Additionally, vacuum formed plastic bas-relief objects can be manufactured from the mold as well. The manufacturing process for each of these products is further explained below.

In the case of the gypsum-based polymer tiles, a material such as the Smooth-On company's duoMatrix NEO™ product may be used. Prior to placing the material into the mold, it is desirable to apply a release agent to the surface of the mold to prevent the gypsum polymer mixture from sticking to the rubber mold. In addition to using the gypsum polymer mixture directly, in some preferred embodiments of the present invention a metal powder (i.e., bronze, brass, copper, or nickel/silver, etc.) can be added. In these embodiments, a small amount of the metal powder is mixed with a small amount of the gypsum polymer material and applied to the surface of the mold. Once the metal powder/polymer mixture has dried, additional gypsum polymer material can be placed into the mold to complete the tile-making process.

Once the tile has been removed from the mold, the release agent can be removed from the tile using dishwashing liquid and water. Alternatively, acetone may be used to remove the release agent from the tile. After the tile has been dried, the surface of the tile may be abraded with fine steel wool to promote better surface adhesion of various stains and/or shellacs, as desired. After abrasion, any desired stain or shellac may be applied to the surface of the tile and allow it to dry. This process may be repeated as necessary until the desired surface treatment has been achieved. After drying, the tile may be squared off or evened out by smoothing the edges and/or back of the tile using a disk sander or the like, thereby completing the tile (step 260). In some embodiments of the present invention, other additives such as stone, sand, glass, or the like may be used. Those skilled in the art will recognize that a wide variety of materials may be used in the tile-making process including resin, plaster, concrete, plastic, urethane, and the like.

To create ceramic tiles, it is most likely that a rubber die will be created using the first rubber mold (step 255) previously created from the object to be molded. In this case, the original rubber mold is used to create a rubber die and this rubber die may be considered a "positive" image of the object depicted in the original digital image file. This rubber die is created in much the same manner as previously described in conjunction with the creation of the first rubber mold.

Next, a plaster cast is created from the rubber die (step 265). In this case, a mold box is created as previously explained. However, rather than using silicone to seal the seams of the mold box, Plasticine or similar clay material is used to seal the box and adhere the rubber die to the backboard of the mold box. Then, a mold release is applied to the rubber die as explained before in conjunction with the creation of the first rubber mold.

After the rubber die has been fixed in position and coated, the plaster compound may be mixed and poured into the mold box over and around the rubber die and allowed to harden, thereby creating the plaster cast to be used in manufacturing the glass or ceramic tiles.

Once the plaster case has been removed from the mold box, a soft clay material known as "pug," such as the Laguna Clay Company's EM330, may be pressed into the plaster cast. The pug is typically pressed into the plaster cast using enough pressure to force the pug to fully form within the plaster cast. The pug is then allowed to dry several hours and is then sandwiched between two pieces of gypsum board. At this point the clay tile is called "green ware." The gypsum board will absorb the moisture out of the tile and allow for a uniform curing of the green ware, thereby preventing any warping and cracking of the tile. After the tile is completely dried, it is placed into a kiln and fired to approximately 1,940 degrees Fahrenheit and then allowed to cool to room temperature. This step is commonly referred to as "bisque firing."

If desired, the bisque-fired tile may be glazed with one or more coats of glaze after it has cooled. After glazing, the tile is placed back into the kiln for a "glaze firing," which is typically done at a temperature of approximately 1,830 degrees Fahrenheit. Once again, the tile is cooled and removed from the kiln, thereby producing a ceramic tile (step 275).

A similar process may be used to create glass tiles. In the case of glass tiles, the plaster cast is filled with glass pieces and the plaster cast in then placed into the kiln and fired. As before, the tile is allowed to cool in the kiln and is then removed. The various firing processes and procedures used to create ceramic and glass tiles are well known to those skilled in the art.

In addition to the mold creation processes discussed above, it is also possible to incorporate a slip casting process into the methods of the present invention. In the slip casting process, plaster molds may be created as described above in conjunction with FIG. 2. Once a plaster mold has been created, the slip casting process may be utilized (step 285 of FIG. 2). In the case of the slip casting process, the molds are dried and typically dusted with a talc powder or silica, depending on the type of firing process to be utilized. With the slip casting process, the plaster molds are created in pairs and joined together with rubber bands or some other similar materials that will prevent the mold halves from separating. A smooth casting slip is then poured into the plaster mold to create a casting.

In addition to the gypsum-based polymer ceramic/glass tiles, the mold created by method 200 may be used to create vacuum formed plastic bas-relief objects. One suitable machine for creating vacuum formed plastic bas-relief objects is produced by The American Thermoform Corporation at 1758 Brackett Street, La Verne, Calif. 91750. Similar vacuum forming machines could also be used to create vacuum formed plastic bas-relief objects in accordance with a preferred embodiment of the present invention.

The mold is covered with a sheet of "Brailon," which is a sheet of plastic material specifically designed to be used in this process. With the plastic material in place, the mold is placed into the oven and the vacuum pump is actuated. The sound of the pump will be audible and a blue indicator light will be lit. Immediately push the oven enclosure to its rear position.

From the foregoing description, it should be appreciated that apparatus and methods of the present invention provide significant benefits that would be apparent to one skilled in the art. Furthermore, while multiple embodiments have been presented in the foregoing description, it should be appreciated that a vast number of variations in the embodiments exist.

Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A method comprising the steps of:
    loading a digital image file into a computer memory;
    converting said digital image file into a bitmap file;
    processing said bitmap file to create a heightfield map;
    using the heightfield map to create a 3D model;
    creating a mold based on said 3D model in said computer memory, wherein said step of processing said bitmap file into said heightfield map comprises creating a polygon mesh to describe said heightfield map as a set of connected triangles; and
    creating at least two different tiles that can be manufactured from said mold, wherein the at least two different tiles include ceramic, glass tiles, gypsum polymer tiles and plastic resin tiles.

2. The method of claim 1 wherein said step of loading a digital image file into said computer memory comprises the step of loading a jpeg file from a digital camera or scanner into said computer memory.

3. The method of claim 1 wherein said step of loading a digital image file into said computer memory comprises the step of downloading an electronic file from the Internet into said computer memory.

4. The method of claim 1 wherein a three-dimensional printer, Computer Numeric Controlled (CNC) milling or stereo lithography is used to create the physical object.

5. The method of claim 1 wherein said mold comprises a rubber, plaster or metal mold.

6. The method of claim 1 further comprising the steps of:
    mixing metal powder with a gypsum polymer material or plastic resin; and
    applying said gypsum powder or said plastic resin to said mold.

7. The method of claim 6 wherein said metal powder comprises one of a brass powder, a bronze powder and a nickel/silver powder.

8. An apparatus comprising:
    a network
    a computer coupled to said network, said computer comprising a memory to implement the steps of:
        loading a digital image file into a computer memory;
        converting said digital image file into a bitmap file;
        processing said bitmap file to create a heightfield map;
        using the heightfield map to create a 3D model;
        creating a mold based on said 3D model in said computer memory, wherein said step of processing said bitmap file into said heightfield map comprises creating a polygon mesh to describe said heightfield map as a set of connected triangles; and
        creating at least two different tiles that can be manufactured from said mold, wherein the at least two different tiles include ceramic, glass tiles, gypsum polymer tiles and plastic resin tiles.

* * * * *